United States Patent
James

(10) Patent No.: US 9,552,249 B1
(45) Date of Patent: Jan. 24, 2017

(54) SYSTEMS AND METHODS FOR TROUBLESHOOTING ERRORS WITHIN COMPUTING TASKS USING MODELS OF LOG FILES

(71) Applicant: Symantec Corporation, Mountain View, CA (US)

(72) Inventor: Alex James, Pune (IN)

(73) Assignee: Veritas Technologies, Mountain View, CA (US)

( * ) Notice: Subject to any disclaimer, the term of this patent is extended or adjusted under 35 U.S.C. 154(b) by 141 days.

(21) Appl. No.: 14/519,107

(22) Filed: Oct. 20, 2014

(51) Int. Cl.
G06F 11/34 (2006.01)
G06F 11/07 (2006.01)

(52) U.S. Cl.
CPC ......... *G06F 11/079* (2013.01); *G06F 11/0769* (2013.01); *G06F 11/3447* (2013.01); *G06F 11/0766* (2013.01); *G06F 11/3476* (2013.01)

(58) Field of Classification Search
CPC .............. G06F 11/3447; G06F 11/3452; G06F 11/3476; G06F 11/147; G06F 11/079; G06F 11/0766; G05B 23/0245; G05B 23/0254

See application file for complete search history.

(56) References Cited

U.S. PATENT DOCUMENTS

| | | | | |
|---|---|---|---|---|
| 5,463,768 A * | 10/1995 | Cuddihy | ............... | G06F 11/079 714/37 |
| 2007/0028219 A1* | 2/2007 | Miller | .................. | G05B 23/021 717/124 |
| 2012/0101800 A1* | 4/2012 | Miao | ................... | G06F 11/3608 703/22 |
| 2012/0303641 A1* | 11/2012 | Gudlavenkatasiva | | G06F 11/0709 707/755 |
| 2015/0213392 A1* | 7/2015 | Kittur | .............. | G06Q 10/06398 705/7.42 |
| 2015/0254161 A1* | 9/2015 | Baril | ................... | G06F 11/3616 717/124 |

OTHER PUBLICATIONS

Thompson, Kerry "LogSurfer Software and Resources", http://www.crypt.gen.nz/logsurfer/, as accessed Aug. 25, 2014, (Mar. 13, 2004).
"LOGalyze", http://www.logalyze.com/, as accessed Aug. 25, 2014, (Dec. 12, 2007).

(Continued)

*Primary Examiner* — Joseph Schell
(74) *Attorney, Agent, or Firm* — Fisherbroyles LLP

(57) ABSTRACT

The disclosed computer-implemented method for troubleshooting computing tasks using log files may include (1) identifying multiple log files generated during successful executions of a computing task, (2) identifying an anomalous log file generated during an anomalous execution of the computing task, (3) creating a model of a successful log file for the computing task by (a) identifying invariants that represent matching sequences found in the same location within at least two successful log files and (b) storing each invariant in a node within the model, and (4) traversing, sequentially through the anomalous log file, matching sequences within the anomalous log file with nodes within the model until identifying at least one discrepancy between the anomalous log file and the model. Various other methods, systems, and computer-readable media are also disclosed.

20 Claims, 8 Drawing Sheets

(56) References Cited

OTHER PUBLICATIONS

"Logfile", http://en.wikipedia.org/wiki/Logfile, as accessed Aug. 25, 2014, Wikipedia, (Aug. 13, 2013).
"Task (computing)", http://en.wikipedia.org/wiki/Task_(computing), as accessed Aug. 25, 2014, Wikipedia, (Oct. 26, 2011).
"Trie", http://en.wikipedia.org/wiki/Trie, as accessed Aug. 25, 2014, Wikipedia, (Dec. 29, 2003).
"Finite-state machine", http://en.wikipedia.org/wiki/Finite-state_machine, as accessed Aug. 25, 2014, Wikipedia, (Dec. 15, 2005).
"Edit distance", http://en.wikipedia.org/wiki/Edit_distance, as accessed Aug. 25, 2014, Wikipedia, (Nov. 24, 2004).
"Needleman—Wunsch algorithm", http://en.wikipedia.org/wiki/Needleman%E2%80%93Wunsch_algorithm, as accessed Aug. 25, 2014, Wikipedia, (Apr. 23, 2010).

* cited by examiner

```
Successful Log File
    208(1)
       •
       •
       •
22:28:13.451 [23887] <2> logconnections: BPDM ACCEPT FROM 10.81.135.45.44706 TO
                10.81.135.45.1372 fd = 9
22:28:13.451 [23887] <2> vnet_pcache_init_table: [vnet_private.c:212] starting cache size 200 0xc8
22.28.13.453 [23887] <2> vnet_cached_getnameinfo: [vnet_addrinfo.c:1922] found via getnameinfo
                OUR_HOST=bpttest1036.rmnus.sen.symantec.com IPSTR=10.81.135.45
22.28.13.453 [23887] <4> bpdbm: VERBOSE = 5
       •
       •
       •
```

```
Successful Log File
    208(2)
       •
       •
       •
22:32:00.507 [24534] <2> logconnections: BPDM ACCEPT FROM 192.168.2.43.63697 TO
                192.168.2.43.1372 fd = 384
22:32:00.507 [24534] <2> vnet_pcache_init_table: [vnet_private.c:212] starting cache size 200 0xc8
22.32.00.509 [24534] <2> vnet_cached_getnameinfo: [vnet_addrinfo.c:1922] found via getnameinfo
                OUR_HOST=celeron.punin.sen.symantec.com IPSTR=10.0.25.31
22.32.00.509 [24534] <4> bpdbm: VERBOSE = 5
       •
       •
       •
```

*FIG. 4*

Aligned Log Files
600

•
•
•

<2> logconnections: BPDM ACCEPT FROM * TO * fd = *
<2> vnet_pcache_init_table: [vnet_private.c:212] starting cache size 200 0xc8
<2> vnet_cached_getnameinfo: [vnet_addrinfo.c:1922] found via getnameinfo OUR_HOST= * IPSTR= *
<4> bpdbm: VERBOSE = 5

SYSTEMS AND METHODS FOR TROUBLESHOOTING ERRORS WITHIN COMPUTING TASKS USING MODELS OF LOG FILES

BACKGROUND

Log files may track and record the progress of applications, programs, services, and other computing tasks as they execute. For example, an operating system may automatically create log files that record each event (e.g., each executed function, each received communication, etc.) that occurs while a computing task runs. In some cases, log files may be used to troubleshoot and/or debug computing tasks. Specifically, traditional methods for troubleshooting computing tasks may involve analyzing error messages that are written to log files when an anomalous condition arises during a program's execution.

Unfortunately, troubleshooting computing tasks based on error messages written to log files to may be inefficient and/or ineffective. For example, identifying error messages within log files may require sorting through large amounts of data, consuming both time and computing resources. In addition, some error messages within log files may only indicate the result of the problem (or the result of an accumulation of problems), rather than identifying the source of the error. As such, the current disclosure identifies and addresses a need for additional and improved systems and methods for troubleshooting computing tasks using log files.

SUMMARY

As will be described in greater detail below, the instant disclosure describes various systems and methods for troubleshooting computing tasks using log files by creating a model of a log file generated during a successful execution of a computing task and comparing sequences within the model to sequences within a log file generated during an anomalous execution of the computing task. In one example, a computer-implemented method for performing such a task may include (1) identifying multiple log files generated during successful executions of a computing task, (2) identifying an anomalous log file generated during an anomalous execution of the computing task, (3) creating a model of a successful log file for the computing task by (a) identifying invariants that represent matching sequences found in the same location within at least two successful log files and (b) storing each invariant in a node within the model, and (4) traversing, sequentially through the anomalous log file, matching sequences within the anomalous log file with nodes within the model until identifying at least one discrepancy between the anomalous log file and the model. In some examples, identifying the anomalous log file may include receiving the anomalous log file from a user that is troubleshooting the computing task.

In some embodiments, creating the model may include removing information irrelevant to the performance of the computing task from the successful log files before identifying the invariants within the successful log files. In addition, in some examples, identifying the invariants may include aligning each function within multiple successful log files and traversing over each character within the aligned log files to identify matching sequences of characters. In these examples, aligning each function within the successful log files may include (1) representing each function within the successful log files with a separate symbol such that each successful log file is represented by a string of symbols, (2) aligning the strings of symbols using a sequence alignment algorithm, and (3) aligning each function within the successful log files based on the aligned strings. In addition, in these examples, the multiple log files may represent the two most similar successful log files. Furthermore, creating the model of the successful log file may include (1) creating an initial model based on the two most similar successful log files and (2) refining the initial model based on the remaining successful log files.

In some embodiments, the model of the successful log file may include a trie with multiple branches. In such embodiments, matching sequences within the anomalous log file with nodes within the model may include identifying branches within the trie that correspond to sequences within the anomalous log file.

In some examples, identifying the discrepancy between the anomalous log file and the model may include determining that a sequence in a particular location within the anomalous log file differs from a sequence in the same location within the model. Additionally or alternatively, identifying the discrepancy between the anomalous log file and the model may include determining that the anomalous log file contains an additional sequence not included in the model and/or determining that the anomalous log file terminates before the end of the model.

In some embodiments, the method may further include replacing known variants within the successful log files with predetermined strings prior to identifying the invariants. Additionally, in some examples, the method may further include troubleshooting the anomalous log file based on error messages within the anomalous log file, an expected execution time of the computing task, and/or edit-distances between sequences within the model and sequences within the anomalous log file.

In one embodiment, a system for implementing the above-described method may include (1) an identification module that identifies (a) multiple log files generated during successful executions of a computing task and (b) an anomalous log file generated during an anomalous execution of the computing task, (2) a creation module that creates a model of a successful log file for the computing task by (a) identifying invariants that represent matching sequences found in the same location within at least two successful log files and (b) storing each invariant in a node within the model, and (3) a traversing module that traverses, sequentially through the anomalous log file, matching sequences within the anomalous log file with nodes within the model until identifying at least one discrepancy between the anomalous log file and the model. In addition, the system may include at least one processor that executes the identification module, the creation module, and the traversing module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify multiple log files generated during successful executions of a computing task, (2) identify an anomalous log file generated during an anomalous execution of the computing task, (3) create a model of a successful log file for the computing task by (a) identifying invariants that represent matching sequences found in the same location within at least two successful log files and (b) storing each invariant in a node within the model, and (4) traverse, sequentially through the anomalous log file, matching sequences within the anomalous log file with nodes within the model until identifying at least one discrepancy between the anomalous log file and the model.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is an illustration of log files generated during successful executions of a computing task.

FIG. 6 is an illustration of matching sequences found within aligned log files.

Figure 1:
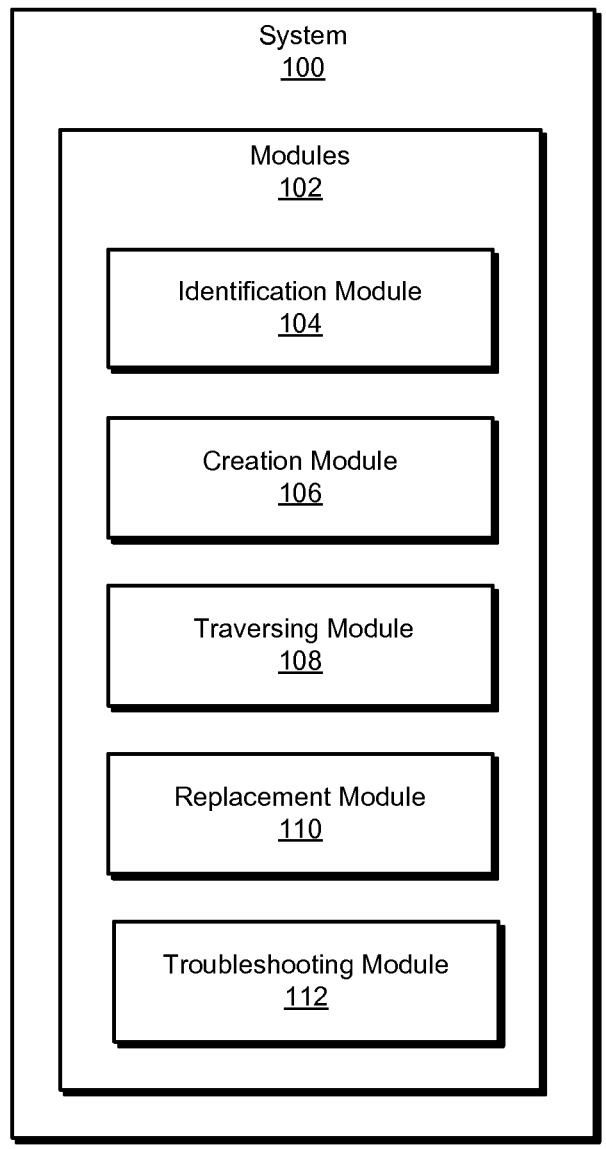
FIG. 1 is a block diagram of an exemplary system for troubleshooting computing tasks using log files.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for troubleshooting computing tasks using log files. As will be explained in greater detail below, by analyzing log files generated during successful executions of a computing task, the disclosed systems and methods may produce a model that represents the order and location of functions within a successful log file. Specifically, by aligning functions within log files based on a sequence alignment algorithm, the systems and methods described herein may accurately and efficiently identify sequences of characters that are common to successful log files, as well as identify sequences of characters that vary between successful log files. In addition, by sequentially comparing sections of a log file generated during an anomalous execution of a computing task with a model of a log file generated during a successful execution of the computing task, the disclosed systems and methods may enable a user to quickly and precisely identify problems and irregularities within the computing task.

Figure 2:
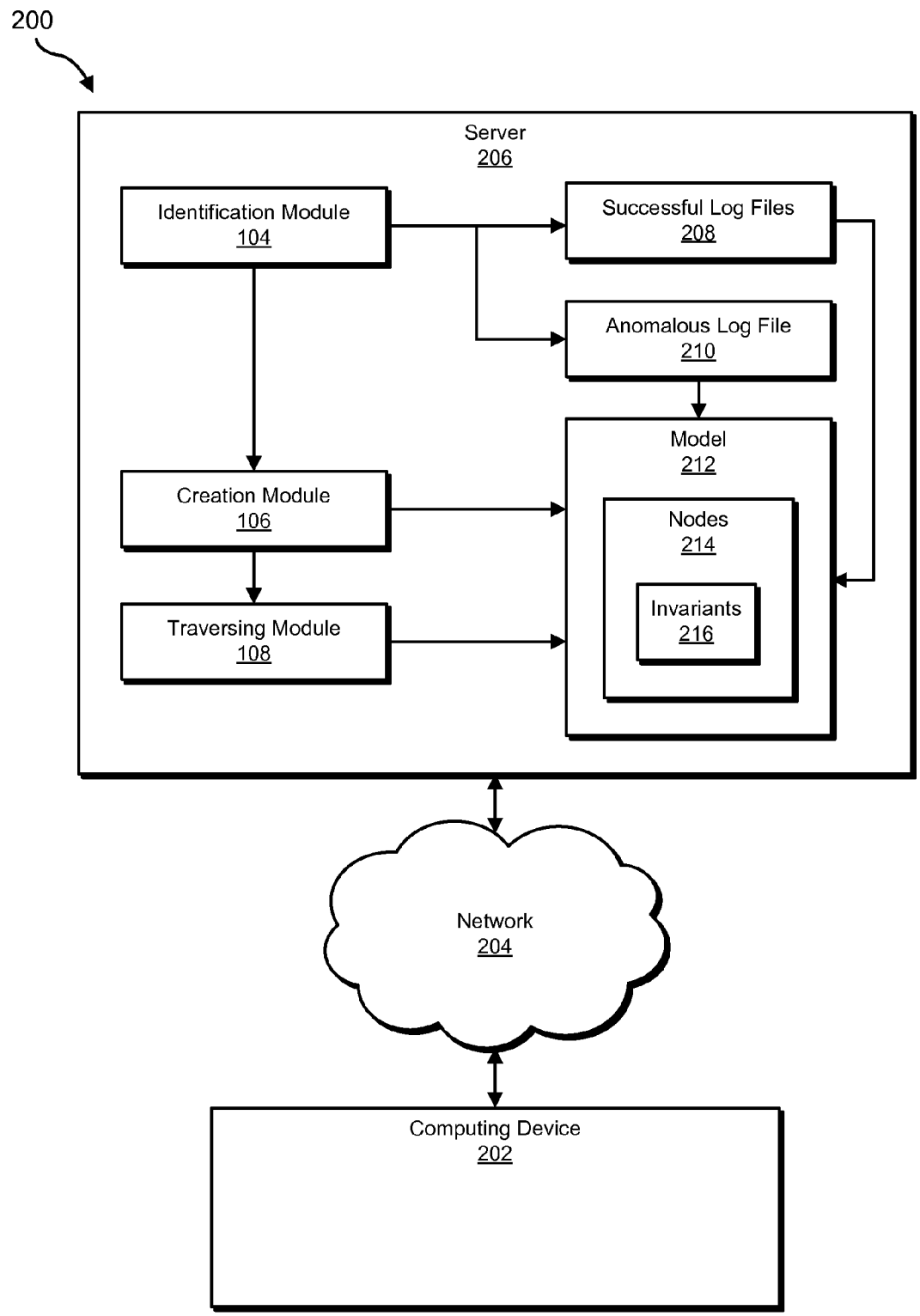
FIG. 2 is a block diagram of an additional exemplary system for troubleshooting computing tasks using log files.

The following will provide, with reference to FIGS. 1 and 2, detailed descriptions of exemplary systems for troubleshooting computing tasks using log files. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for troubleshooting computing tasks using log files. As illustrated in this figure, exemplary system 100 may include one or more modules 102 for performing one or more tasks. For example, and as will be explained in greater detail below, exemplary system 100 may include an identification module 104 that identifies (1) multiple log files generated during successful executions of a computing task and (2) an anomalous log file generated during an anomalous execution of the computing task. Exemplary system 100 may also include a creation module 106 that creates a mode of a successful log file by (1) identifying invariants that represent matching sequences found in the same location within at least two successful log files and (2) storing each invariant in a node within the model.

In addition, and as will be described in greater detail below, exemplary system 100 may include a traversing module 108 that traverses, sequentially through the anomalous log file, matching sequences within the anomalous log file with nodes within the model until identifying at least one discrepancy between the anomalous log file and the model. Furthermore, exemplary system 100 may include a replacement module 110 that replaces known variants within the successful log files with predetermined strings. Finally, exemplary system 100 may include a troubleshooting module 112 that troubleshoots the anomalous log file based on one or more additional analyses. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In some examples, computing device 202 and/or server 206 may be programmed with one or more of modules 102. In the example of FIG. 2, modules 102 may reside client-side on computing device 202. In this example, modules 102 may facilitate a user troubleshooting a computing task executing on computing device 202. In another example, one or more of modules 102 may reside server-side on server 206. In this example, modules 102 may operate in the context of a backend server that facilitates troubleshooting one or more computing tasks for multiple users of different computing devices (e.g., computing device 202). Alternatively, both server 206 and computing device 202 may be merged into a single machine or computing system.

In one embodiment, one or more of modules 102 from FIG. 1 may, when executed by at least one processor of computing device 202 and/or server 206, enable computing device 202 and/or server 206 to troubleshoot computing tasks using log files. For example, and as will be described in greater detail below, identification module 104 may cause computing device 202 and/or server 206 to identify (1) multiple log files (e.g., successful log files 208) generated during successful executions of a computing task and (2) an anomalous log file (e.g., anomalous log file 210) generated during an anomalous execution of the computing task. In addition, creation module 106 may cause computing device 202 and/or server 206 to create a model (e.g., model 212) of a successful log file by (1) identifying invariants (e.g., invariants 216) that represent matching sequences found in the same location within at least two of successful log files 208 and (b) storing invariants 216 in nodes (e.g., nodes 214) within model 212. Finally, traversing module 108 may cause computing device 202 and/or server 206 to traverse, sequentially through anomalous log file 210, matching sequences within anomalous log file 210 with nodes 214 until identifying a discrepancy between anomalous log file 210 and model 212.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of storing and/or analyzing log files. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
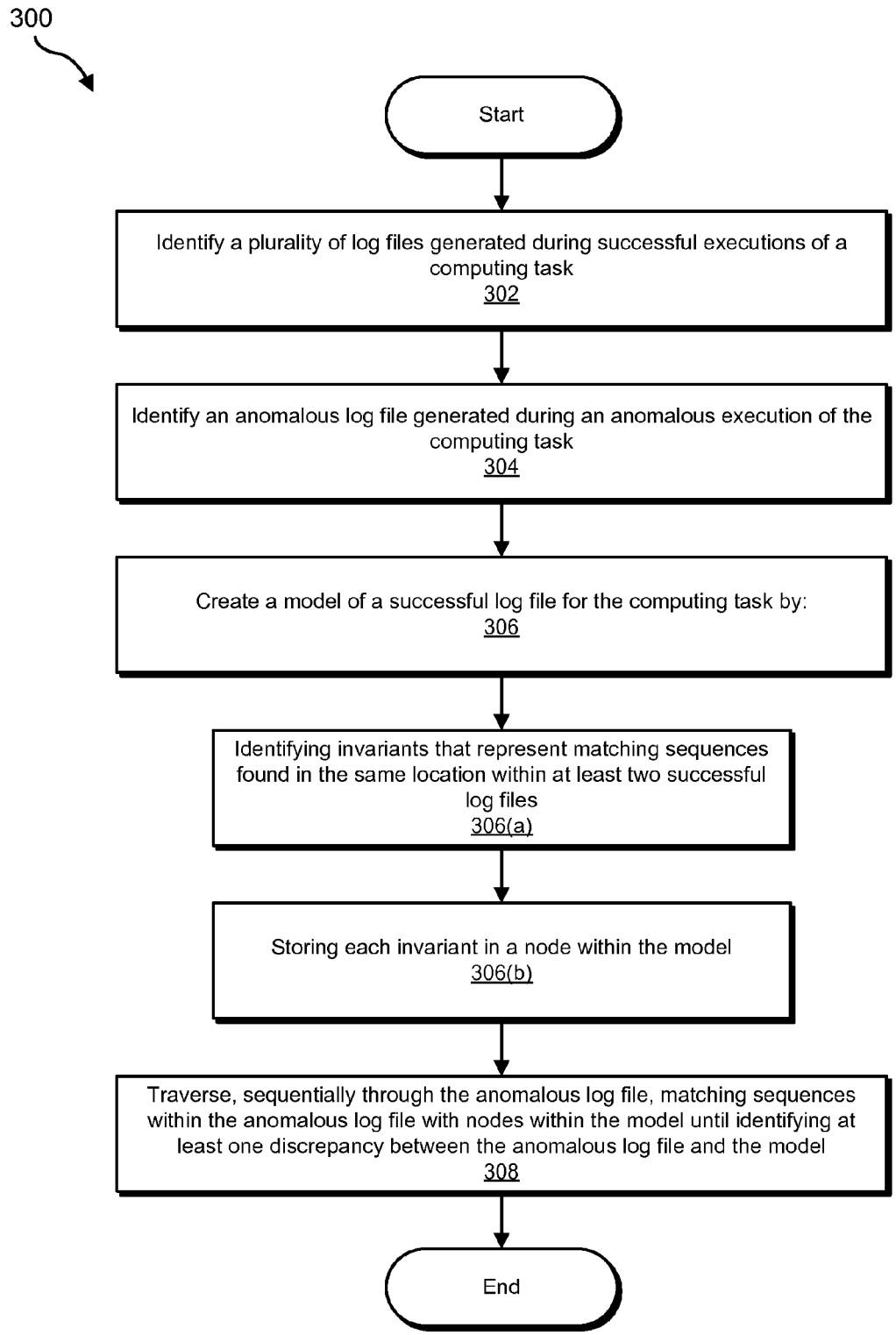
FIG. 3 is a flow diagram of an exemplary method for troubleshooting computing tasks using log files.

FIG. 3 is a flow diagram of an exemplary computer-implemented method 300 for troubleshooting computing tasks using log files. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302 one or more of the systems described herein may identify multiple log files generated during successful executions of a computing task. For example, identification module 104 may, as part of server 206 in FIG. 2, identify successful log files 208 that were generated during successful executions of a computing task.

The term "computing task," as used herein, generally refers to any type or form of process, thread, or job performed or executed by a computing device. A computing task may represent any task that executes in the foreground or the background of a computing device. Examples of computing tasks include, without limitation, modifying (e.g., updating, installing, or deleting) an application, opening and/or executing an application, saving or altering data within a file, receiving and/or sending a communication, accessing a database or server, providing notifications to a user, monitoring processes running on a computing device, combinations of one or more of the same, and/or any additional type of computing task.

In addition, the term "log file," as used herein, generally refers to any type or form of document or data structure that contains information relevant to the execution of one or more computing tasks. In some examples, an operating system may (e.g., automatically or in response to direction from a user) create and/or populate a log file in response to detecting and/or completing each event involved in the process of executing a computing task. For example, a log file may record each step of receiving a communication (e.g., establishing a connection with a server, identifying the communication, processing the communication, etc.). In another example, a log file may record the number and/or origin of requests to access a website or server. In some embodiments, a log file may record the progress of a computing task as a series of functions. The term "function," as used herein, generally refers to any individual command, label, or identifier that describes a single event within a log file.

Furthermore, in some embodiments, a log file may record error messages that indicate the presence and/or severity of anomalous events (e.g., unexpected and/or problematic events) detected during the execution of a computing task. Moreover, in addition to tracking events that occur during the execution of a computing task, a log file may store information that identifies the computing device executing the task, the time and/or date at which the task was executed, and/or any additional information associated with the computing task. Furthermore, a log file may record, store, and present data in a variety of formats, including human-readable text and computer code (e.g., binary or hexadecimal sequences).

In addition, the term "successful log file," as used herein, generally refers to any log file that was generated during a successful execution of a computing task. For example, a successful log file may be generated while a computing task executes without any errors (e.g., while the computing task produces correct or expected results). On the other hand, the term "anomalous log file," as used herein, generally refers to any log file that was generated during an anomalous execution of a computing task. For example, an anomalous log file may be generated during an execution of a computing task that results in errors or abnormalities.

The systems described herein may identify log files generated during successful executions of a computing task in a variety of ways. In some examples, identification module 104 may identify successful log files 208 within a database or data store within server 206. For example, identification module 104 may generate, simulate, or otherwise produce successful log files 208 within server 206 and store successful log files 208 within server 206 such that successful log files 208 may later be analyzed. Alternatively, identification module 104 may identify successful log files 208 after successful log files 208 have been generated on one or more other computing devices.

Specifically, in an exemplary embodiment, identification module 104 may receive successful log files 208 from one or more computing devices (e.g., computing device 202) connected to server 206 via network 204. In this embodiment, the systems described herein may trigger and/or query computing devices executing a particular computing task to send log files generated during successful executions of the particular computing task. In this way, the systems described herein may collect data that describes the execution of the computing task in a variety of contexts and on a variety of devices.

Notably, each of successful log files 208 (as well as anomalous log file 210) may have been generated during executions of the same computing task and within similar computing environments. For example, each of successful log files 208 may have been generated during execution of the same protocol of a particular computing task. In addition, each of successful log files 208 may have been generated using the same type and/or version of logging software. In addition, each instance of the logging software used may be configured with the same settings.

As an example of successful log files, FIG. 4 illustrates portions of successful log files 208(1) and 208(2). In this example, each line within a log file may be labelled with a timestamp (i.e., beginning with "22:28:13.451" in successful log file 208(1) and "22:32:00.507" in successful log file 208(2)). In addition, each line may be labelled with an identification number associated with the process that was executing while the log file was generated (i.e., "23887" in successful log file 208(1) and "24534" in successful log file 208(2)). Furthermore, each line within the log files may contain one function (e.g., a "logconnections" function, a "vnet_pcache_init_table" function etc.). As illustrated in FIG. 4, each function may be located in the same location (i.e., in the same order) within successful log file 208(1) and successful log file 208(2), but certain strings (e.g., IP addresses and host names) may vary within the functions.

Returning to FIG. 3, at step 304 one or more of the systems described herein may identify an anomalous log file generated during an anomalous execution of the computing task. For example, identification module 104 may, as part of server 206 in FIG. 2, identify anomalous log file 210 that was generated during an anomalous execution of the computing task.

The systems described herein may identify an anomalous log file in a variety of ways. In some examples, identification module 104 may generate anomalous log file 210 at server 206. Alternatively, identification module 104 may receive anomalous log file 210 from computing device 202 via network 204. Specifically, in an exemplary embodiment, identification module 104 may receive anomalous log file 210 from a user of computing device 202 (or a troubleshooting application installed on computing device 202) while the user is troubleshooting the computing task on computing device 202. For example, the user may determine that the computing task is functioning improperly (e.g., by identifying incorrect outputs from the computing task and/or by identifying error messages within anomalous log file 210). In response to determining that the computing task is functioning improperly, the user may send anomalous log file 210 to server 206 for analysis. Notably, identification module 104 may identify anomalous log file 210 at any point before, during, or after identifying successful log files 208.

Returning to FIG. 3, at step 306 one or more of the systems described herein may create a model of a successful log file for the computing task by (1) identifying invariants that represent sequences found in the same location within at least two successful log files and (2) storing each invariant in a node within the model. For example, creation module 106 may, as part of server 206 in FIG. 2, create model 212 by (1) identifying invariants 216 within successful log files 208 and (2) storing invariants 216 within nodes 214.

The systems described herein may create a model of a successful log file in a variety of ways. In one embodiment, creation module 106 may create model 212 in response to identifying anomalous log file 210. Alternatively, creation module 106 may create model 212 before identifying anomalous log file 210 in order to quickly analyze anomalous log file 210 once anomalous log file 210 is received from a user. In general, creation module 106 may create model 212 at any point after identifying successful log files 208.

Successful log files 208 may contain a variety of information associated with the computing task. As previously mentioned, each of successful log files 208 may include information identifying the particular computing device, time, date, and/or user associated with the log file. As such information may be irrelevant to the performance of the computing task, creation module 106 may remove the information (e.g., the computing device identification numbers, timestamps, etc.) from each of successful log files 208 before beginning an analysis of the content (e.g., event data, functions, etc.) within successful log files 208. In this way, the systems described herein may create a general model of a successful log file that may be used to analyze an anomalous log file generated on any computing device.

Also as previously mentioned, each of successful log files 208 may contain a similar sequence of functions that describe the execution of the computing task. However, the content and/or order of each function may differ between one or more of successful log files 208 (e.g., due to differences in the configuration and/or location of the computing devices that generated successful log files 208). For example, computing tasks that involve IP addresses, port numbers, host names, etc. may result in log files that contain varying strings of numbers and text in certain locations. In addition, log files generated on different computing devices or at different times may contain different sequences of branches or loops. As such, creation module 106 may create a model of a successful log file by determining which sequences of characters are representative of a successful log file (i.e., invariants) and which sequences may vary between successful log files (i.e., variants).

Creation module 106 may identify invariants 216 in a variety of ways. In some examples, creation module 106 may identify invariants 216 by aligning each line or function within successful log files 208 and then traversing over each character within the aligned log files to identify matching sequences of characters. In some embodiments (e.g., in the example of FIG. 4), each of successful log files 208 may contain the same sequence of functions in the same order (e.g., the functions within successful log files 208 may have a 1:1 alignment). In such cases, creation module 106 may quickly and efficiently align each function and identify invariants 216 within the functions.

However, in other embodiments, some sequences of functions may vary between two or more of successful log files 208 (e.g., due to branches and/or loops). In such embodiments, creation module 106 may implement one or more sequence alignment algorithms in order to establish a 1:1 alignment between the functions within successful log files 208. The term "sequence alignment algorithm," as used herein, generally refers to any type or form of mathematical process, rules, or steps that identify and align matching segments of strings. In some examples, a sequence alignment algorithm may insert gaps into one sequence in order to maximize the alignment between two sequences. Additionally or alternatively, a sequence alignment algorithm may identify or replace segments of characters that vary between two sequences. Furthermore, some sequence alignment algorithms may only align two sequences at a time, while others may produce alignments between more than two sequences. Notably, sequence alignment algorithms may be used to identify invariants within multiple strands of DNA, as DNA strands may be described by strings of letters (i.e., A, C, G, and T). Examples of sequence alignment algorithms include, without limitation, Needleman-Wunsch algorithms, Hirschberg's algorithm, and Smith-Waterman algorithms.

Figure 5:
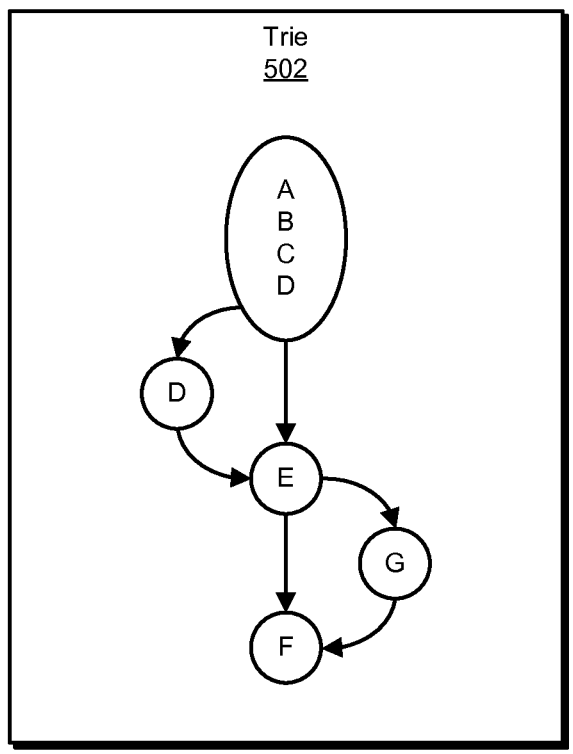
FIG. 5 is an illustration of two sequences aligned based on a sequence alignment algorithm and organized into a trie.

In some examples, creation module 106 may represent successful log files 208 with strings of symbols in order to most effectively implement a sequence alignment algorithm. For example, creation module 106 may assign each unique function within successful log files 208 a unique symbol (e.g., a letter, number, or special character) and represent the sequences of functions within successful log files 208 with corresponding symbols. As an example of sequences represented with symbols, FIG. 5 illustrates a sequence alignments 500. As shown in FIG. 5, sequence alignments 500 may contain a sequence 1 ("ABCDEF") and a sequence 2 ("ABCDDEGF"). In one embodiment, the second "D" within sequence 2 may represent a loop of the "D" function and the "G" within sequence 2 may represent a branch after the "E" function. In such an embodiment, a sequence alignment algorithm performed on sequence 1 and sequence 2 may insert gaps into sequence 1 such that sequence 1 reads "ABCD_E_F," while leaving sequence 2 unaltered.

Once creation module 106 aligns each function within successful log files 208, creation module 106 may align each character within successful log files 208 based on the aligned functions. Creation module 106 may then traverse over each aligned character in order to identify general strings that represent invariants and variants within the functions. For example, creation module 106 may identify one general string for each function. Referring to the example of FIG. 4, creation module 106 may align the first functions (i.e., the "logconnections" functions) within successful log files 208(1) and 208(2). In this example, aligning and comparing the "logconnections" functions may result in a general string of "<2>logconnections: BPDM ACCEPT FROM 1**.*1****.4*.*** TO 1.*1****.4*.13721 fd=***," with each letter or number representing an invariant and each asterisk representing a variant.

In some examples, after identifying invariants 216, creation module 106 may store invariants 216 in nodes 214 within model 212. Specifically, creation module 106 may store each general string associated with a function in one of nodes 214. In the example of FIG. 4, nodes 214 may be simply represented in a single line, as the functions within successful log files 208(1) and 208(2) align completely. However, in other examples, nodes 214 may be organized with more complex associations within model 212. In an exemplary embodiment, nodes 214 may be organized in a trie. The term "trie," as used herein, generally refers to any type or form of associative data structure that organizes data entries based on their prefixes. For example, a trie may contain parent nodes that point to one or more child nodes. The data entry represented by any child node may be found by appending the contents of each parent node in descending order. As such, a trie may describe any series of sequences (e.g., strings of characters or bits) that have common prefixes.

As an example, FIG. 5 illustrates a trie 502. In this example, trie 502 represents sequences 1 and 2 within sequence alignments 500. As shown in FIG. 5, the first node within trie 502 may contain the string "ABCD," as that sequence is common to both sequence 1 and sequence 2. After the initial node, trie 502 may represent the loop within sequence 2 with a path that branches to the "D" node and the re-connects with the mainline at the "E" node. Trie 502 may represent sequence 1 with a path that traverses directly to the "E" node. From the "E" node, trie 502 may represent the branch within sequence 2 with a path that branches to the "G" node and then re-connects to the mainline at the "F" node. The path that represents sequence 1 may traverse directly to the "F" node. Following the method described by FIG. 5, creation module 106 may create model 212 based on the aligned functions of successful log files 208. For example, each of nodes 214 may contain general strings associated with one or more functions, with branches in model 212 representing possible function branches and/or loops.

In some examples, creation module 106 may create model 212 by creating an initial model based on two of successful log files 208 and then refining and/or expanding the initial model based on the remaining successful log files. For example, creation module 106 may create the initial model based on the two most similar successful log files. Creation module 106 may identify the two most similar log files using any one or combination of similarity algorithms or analyses. In an exemplary embodiment, creation module 106 may perform a term frequency-inverse document frequency (tf-idf) analysis on successful log files 208. The tf-idf analysis may produce a measure of the frequency with which each unique function appears in each of successful log files 208, offset with the frequency with which each function appears in the entirety of successful log files 208. In this embodiment, creation module 106 may then perform a cosine similarity analysis on the frequencies resulting from the tf-idf analysis to determine a numerical measure of the similarity between each of successful log files 208.

Once creation module 106 identifies the two most similar successful log files, creation module 106 may identify the invariants within the two log files. In one example, creation module 106 may then create an initial model (e.g., an initial trie) that represents only the invariants found within the two most similar log files. Next, creation module 106 may compare the sequences of characters within the remaining successful log files to the invariants within the initial model. In some examples, creation module 106 may determine that one or more invariants within the initial model should be re-defined (e.g., by determining that one of successful log files 208 contains varying characters at the location of an initial invariant). In addition, creation module 106 may update the initial model with one or more branches in response to identifying additional branches and/or loops within the remaining log files.

As an example of aligning multiple log files, FIG. 6 illustrates an aligned log files 600. In this example, aligned log files 600 may represent the alignment of each of successful log files 208, including successful log files 208(1)

and 208(2) illustrated in FIG. 4. Additionally, in this example, sequences of multiple variants may be represented by a single asterisk. In some examples, multiple iterations of aligning successful log files may simplify the general strings created from just two successful log files (e.g., the general string based on successful log files 208(1) and 208(2) in FIG. 4). For example, as shown by the asterisks within aligned log files 600, entire IP addresses and host names may be identified as variants after aligning each of successful log files 208.

Furthermore, in some examples, creation module 106 may output and/or store model 212 after creating model 212. For example, creation module 106 may store model 212 within server 206 in order to analyze anomalous log file 210 within server 206 (e.g., in response to a user or computing device sending anomalous log file 210 to server 206 for analysis). Additionally or alternatively, creation module 106 may distribute model 212 to one or more computing devices such that a user may analyze anomalous log file 210 directly on the computing device that is executing the computing task.

Returning to FIG. 3, at step 308 one or more of the systems described herein may traverse, sequentially through the anomalous log file, matching sequences within the anomalous log file with nodes within the model until identifying a discrepancy between the anomalous log file and the model. For example, traversing module 108 may, as part of server 206 in FIG. 2, traverse, sequentially through anomalous log file 210, matching sequences within anomalous log file 210 with nodes 214 within model 212 until identifying a discrepancy between anomalous log file 210 and model 212.

The systems described herein may traverse through the anomalous log file in a variety of ways. In some examples, traversing module 108 may begin traversing through anomalous log file 210 by aligning the characters within the first line or function of anomalous log file 210 with the characters in the general string stored in the first node within model 212. Traversing module 108 may then compare the invariants within the general string with characters in corresponding locations within anomalous log file 210 to identify any discrepancies. Next, traversing module 108 may align and compare the next line or function within anomalous log file 210 with the general string within the next node in model 212. Traversing module 108 may repeat this process until comparing each function within anomalous log file 210 to model 212. Notably, if traversing module 108 reaches a branch within model 212, traversing module 108 may attempt to align the current section of anomalous log file 210 with each branching node in order to identify the sequence of nodes that corresponds to anomalous log file 210.

In an exemplary embodiment, traversing module 108 may traverse through anomalous log file 210 and model 212 by implementing model 212 as a finite state machine. The term "finite state machine," as used herein, generally refers to any type or form of mathematical model that operates in a single state at a time. In some examples, a finite state machine may be programmed to transition to one or more different states in response to particular inputs. As applied to traversing through anomalous log file 210, traversing module 108 may represent each node within model 212 as a state within a finite state machine and each function or line within anomalous log file 210 as input to the finite state machine. Accordingly, supplying a function within anomalous log file 210 as input to a node within model 212 may result in a transition to a subsequent child node within model 212 (e.g., if the function corresponds to the invariants within the node). Alternatively, supplying a function as input to a node may result in a transition to an alternative branching node (e.g., if the function does not correspond to the invariants within the initial node).

While traversing through anomalous log file 210, traversing module 108 may identify a discrepancy between anomalous log file 210 and model 212 in a variety of ways. In some examples, traversing module 108 may determine that a sequence in a particular location within anomalous log file 210 differs from a sequence in the same location within model 212. For example, traversing module 108 may determine that the current sequence of characters within anomalous log file 210 does not match the current node (or nodes, in the case of a branch) within model 212. In some embodiments, after identifying the discrepancy between anomalous log file 210 and model 212, traversing module 108 may continue to traverse through anomalous log file 210 in order to identify any additional discrepancies.

In some examples, traversing module 108 may identify the discrepancy between anomalous log file 210 and model 212 by determining that anomalous log file 210 contains one or more additional sequences not included in model 212. For example, traversing module 108 may determine that anomalous log file 210 contains additional branches and/or loops not included within model 212. In another example, traversing module 108 may determine that model 212 terminates before reaching the end of anomalous log file 210. Alternatively, traversing module 108 may determine that anomalous log file 210 terminates before the reaching the end of model 212. In general, traversing module 108 may identify any discrepancy between anomalous log file 210 and model 212 that indicates a potential problem or irregularity in the execution of the computing task that resulted in anomalous log file 210.

In response to detecting the discrepancy between anomalous log file 210 and model 212, traversing module 108 may indicate the discrepancy in a variety of ways. For example, traversing module 108 may mark the function containing the discrepancy as an anomalous function within anomalous log file 210. In addition, traversing module 108 may create a report detailing the type of discrepancy and/or the location of the discrepancy. In some examples, traversing module 108 may store the report within server 206 or an additional server for future analysis. Additionally or alternatively, traversing module 108 may output the report to a user or computing device that is troubleshooting the computing task.

In some embodiments, the systems described herein may implement one or more enhancements or optimizations during the process of analyzing anomalous log file 210. For example, replacement module 110 may perform an additional analysis of successful log files 208 in order to increase the accuracy and speed of creating model 212. Specifically, before creation module 106 identifies invariants 216, replacement module 110 may perform a heuristic analysis on successful log files 208 to identify any known variants (e.g., IP addresses, host names, etc.) within successful log files 208. Replacement module 110 may then replace the known variants with predetermined strings in order to improve sequence alignment and/or character alignment.

In some examples, the systems described herein may supplement the analysis of anomalous log file 210 based on model 212 with additional troubleshooting methods. In one embodiment, troubleshooting module 112 may analyze error messages within anomalous log file 210. For example, as previously mentioned, an operating system may write or insert messages into log files in response to detecting an anomalous condition during the execution of a computing task. In some examples, troubleshooting module 112 may identify error messages within anomalous log file 210 and report an analysis of the error messages to a user.

Additionally or alternatively, troubleshooting module 112 may analyze anomalous log file 210 based on an expected execution time of the computing task. For example, troubleshooting module 112 may compute the average execution time of a successful execution of the computing task (e.g., by calculating the difference between the final timestamp and the initial timestamp within each of successful log files 208). Troubleshooting module 112 may then compare the expected execution time with the execution time of the computing task while anomalous log file 210 was generated. In some examples, a shorter or longer execution time may indicate errors within the computing task.

Furthermore, in some embodiments, troubleshooting module 112 may troubleshoot anomalous log file 210 based on edit-distances between sequences within model 212 and sequences within anomalous log file 210. The term "edit-distance," as used herein, generally refers to any mathematical metric or measure of the similarity between two strings. In some examples, an edit-distance may be calculated by determining the number of operations required to transform one string into another string. In some examples, troubleshooting module 112 may calculate edit-distances between anomalous strings within anomalous log file 210 and invariants within model 212. In these examples, troubleshooting module 112 may use the calculated edit-distances to quantify the severity of discrepancies between anomalous log file 210 and model 212.

The systems and methods described herein may be implemented in a variety of ways and provide a number of advantages. As explained above, by analyzing log files generated during successful executions of a computing task, the disclosed systems and methods may produce a model that represents the order and location of functions within a successful log file. Specifically, by aligning functions within log files based on a sequence alignment algorithm, the systems and methods described herein may accurately and efficiently identify sequences of characters that are common to successful log files, as well as identify sequences of characters that vary between successful log files. In addition, by sequentially comparing sections of a log file generated during an anomalous execution of a computing task with a model of a log file generated during a successful execution of the computing task, the disclosed systems and methods may enable a user to quickly and precisely identify problems and irregularities within the computing task.

Figure 7:
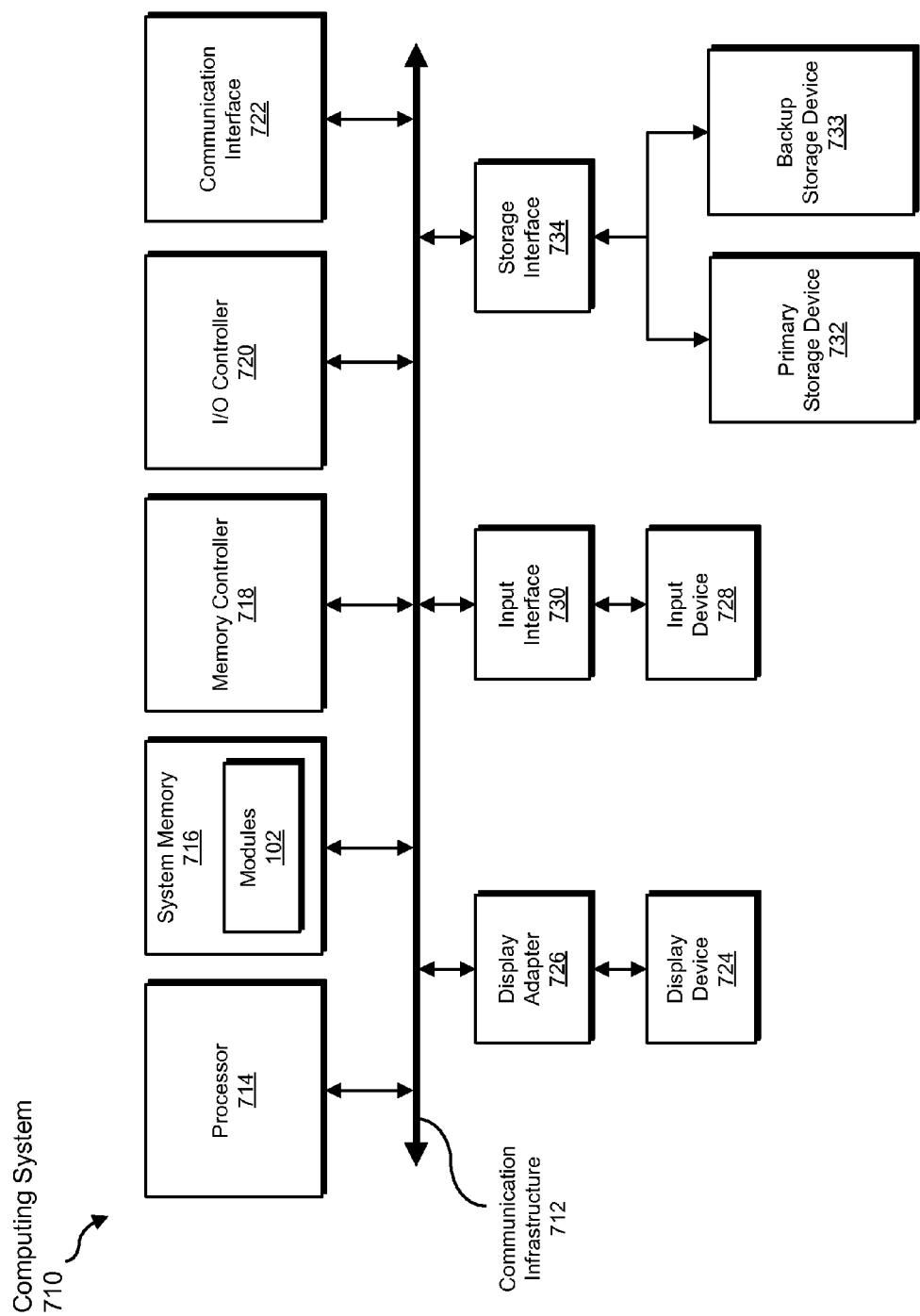
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
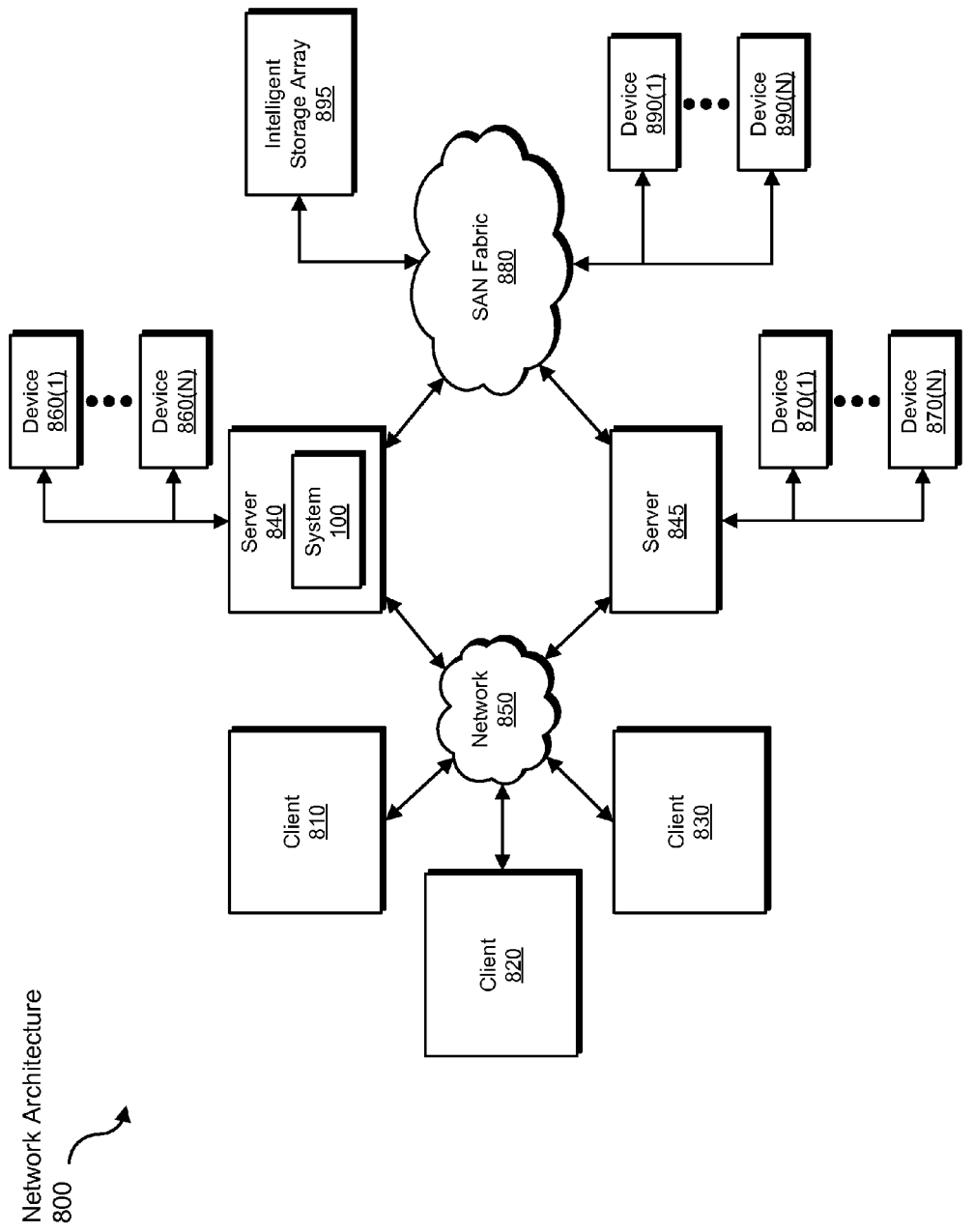
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for troubleshooting computing tasks using log files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive multiple log files, transform the log files, output a result of the transformation to a storage device (e.g., a server), use the result of the transformation to identify anomalies within an additional log file, and store the result of the transformation to a memory or storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for troubleshooting errors within computing tasks using models of log files, at least a portion of the method being performed by a computing device comprising at least one processor, the method comprising:
    identifying a plurality of log files generated during successful executions of a computing task;
    identifying an anomalous log file generated during an anomalous execution of the computing task;
    creating a model of a successful log file for the computing task by:
        identifying invariants that represent matching sequences found in a same location within at least two successful log files;
        storing each invariant in a node within the model;
    traversing, sequentially through the anomalous log file, matching sequences within the anomalous log file with nodes within the model until identifying at least one discrepancy between the anomalous log file and the model.

2. The method of claim 1, wherein identifying the anomalous log file comprises receiving the anomalous log file from a user that is troubleshooting the computing task.

3. The method of claim 1, wherein creating the model comprises removing information irrelevant to the performance of the computing task from the successful log files before identifying the invariants within the successful log files.

4. The method of claim 1, wherein identifying the invariants comprises:
    identifying a plurality of successful log files that each comprise a plurality of functions, each function comprising at least one character;

aligning each function within the plurality of successful log files;
traversing over each character within the aligned functions to identify matching sequences of characters.

5. The method of claim 4, wherein aligning each function within the plurality of successful log files comprises:
representing each function within the plurality of successful log files with a separate symbol such that each successful log file is represented by a string of symbols;
aligning the strings of symbols using a sequence alignment algorithm;
aligning each function within the plurality of successful log files based on the aligned strings.

6. The method of claim 4, wherein creating the model of the successful log file comprises:
identifying, from within the plurality of successful log files, two successful log files that are most similar;
creating an initial model based on the two most similar successful log files;
refining the initial model based on successful log files other than the two most similar successful log files.

7. The method of claim 1, wherein:
the model of the successful log file comprises a trie with multiple branches;
matching sequences within the anomalous log file with nodes within the model comprises identifying branches within the trie that correspond to sequences within the anomalous log file.

8. The method of claim 1, wherein identifying the discrepancy between the anomalous log file and the model comprises at least one of:
determining that a sequence in a particular location within the anomalous log file differs from a sequence in the same location within the model;
determining that the anomalous log file contains an additional sequence not included in the model;
determining that the anomalous log file terminates before the model terminates.

9. The method of claim 1, further comprising replacing known variants within the successful log files with predetermined strings prior to identifying the invariants.

10. The method of claim 1, further comprising troubleshooting the anomalous log file based on at least one of:
error messages within the anomalous log file;
an expected execution time of the computing task;
edit-distances between sequences within the model and sequences within the anomalous log file.

11. A system for troubleshooting errors within computing tasks using models of log files, the system comprising:
an identification module, stored in memory, that identifies:
a plurality of log files generated during successful executions of a computing task;
an anomalous log file generated during an anomalous execution of the computing task;
a creation module, stored in memory, that creates a model of a successful log file for the computing task by:
identifying invariants that represent matching sequences found in a same location within at least two successful log files;
storing each invariant in a node within the model;
a traversing module, stored in memory, that traverses, sequentially through the anomalous log file, matching sequences within the anomalous log file with nodes within the model until identifying at least one discrepancy between the anomalous log file and the model;
at least one processor that executes the identification module, the creation module, and the traversing module.

12. The system of claim 11, wherein the creation module creates the model by removing information irrelevant to the performance of the computing task from the successful log files before identifying the invariants within the successful log files.

13. The system of claim 11, wherein the identification module identifies the invariants by:
identifying a plurality of successful log files that each comprise a plurality of functions, each function comprising at least one character;
aligning each function within the plurality of successful log files;
traversing over each character within the aligned functions to identify matching sequences of characters.

14. The system of claim 13, wherein the identification module aligns each function within the plurality of successful log files by:
representing each function within the plurality of successful log files with a separate symbol such that each successful log file is represented by a string of symbols;
aligning the strings of symbols using a sequence alignment algorithm;
aligning each function within the plurality of successful log files based on the aligned strings.

15. The system of claim 13, wherein the creation module creates the model of the successful log file by:
identifying, from within the plurality of successful log files, two successful log files that are most similar;
creating an initial model based on the two most similar successful log files;
refining the initial model based on successful log files other than the two most similar successful log files.

16. The system of claim 11, wherein:
the model of the successful log file comprises a trie with multiple branches;
the traversing module matches sequences within the anomalous log file with nodes within the model by identifying branches within the trie that correspond to sequences within the anomalous log file.

17. The system of claim 11, wherein the identification module identifies the discrepancy between the anomalous log file and the model by at least one of:
determining that a sequence in a particular location within the anomalous log file differs from a sequence in the same location within the model;
determining that the anomalous log file contains an additional sequence not included in the model;
determining that the anomalous log file terminates before the model terminates.

18. The system of claim 11, further comprising a replacement module that replaces known variants within the successful log files with predetermined strings prior to identifying the invariants.

19. The system of claim 11, further comprising a troubleshooting module that troubleshoots the anomalous log file based on at least one of:
error messages within the anomalous log file;
an expected execution time of the computing task;
edit-distances between sequences within the model and sequences within the anomalous log file.

20. A non-transitory computer-readable medium comprising one or more computer-executable instructions that, when executed by at least one processor of a computing device, cause the computing device to:

identify a plurality of log files generated during successful executions of a computing task;

identify an anomalous log file generated during an anomalous execution of the computing task;

create a model of a successful log file for the computing task by:

identifying invariants that represent matching sequences found in a same location within at least two successful log files;

storing each invariant in a node within the model;

traverse, sequentially through the anomalous log file, matching sequences within the anomalous log file with nodes within the model until identifying at least one discrepancy between the anomalous log file and the model.

* * * * *